Dec. 10, 1940.  L. E. SAUER  2,224,748
PROTECTIVE DEVICE
Filed Oct. 27, 1937
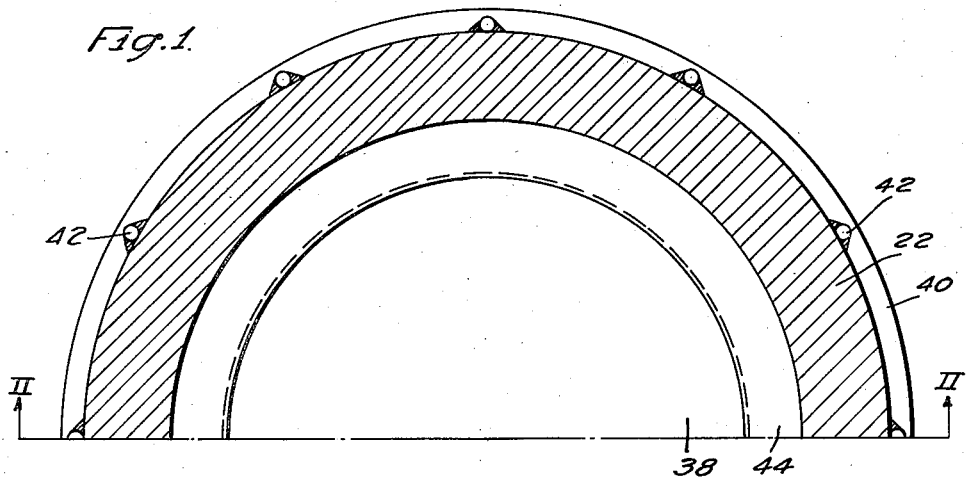
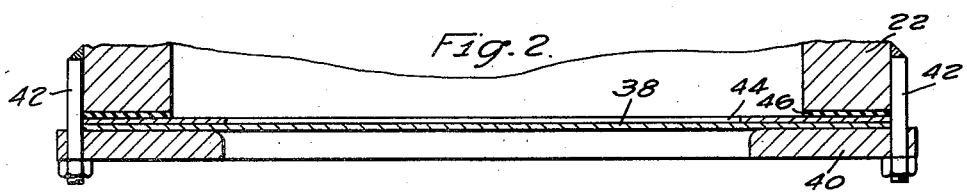
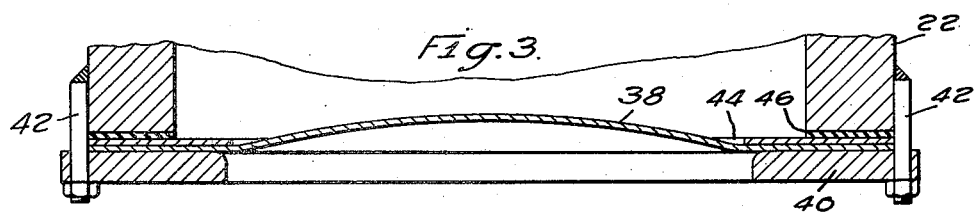
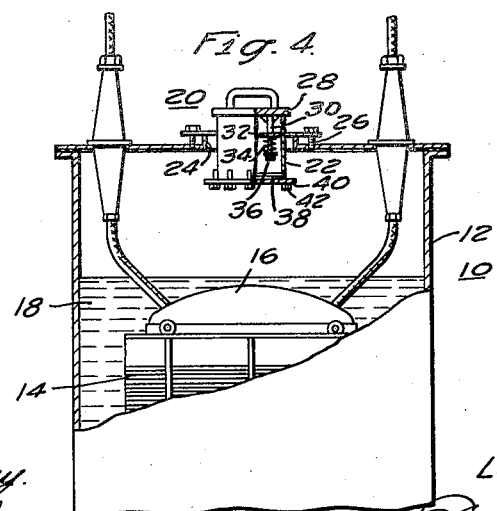
WITNESSES:
E. A. McCloskey.
James N. Ely
INVENTOR
Louis E. Sauer.
BY
Ezra W. Savage
ATTORNEY Patented Dec. 10, 1940

2,224,748

UNITED STATES PATENT OFFICE 2,224,748

PROTECTIVE DEVICE

Louis E. Sauer, Sharon, Pa., assignor to Westinghouse Electric & Manufacturing Company, East Pittsburgh, Pa., a corporation of Pennsylvania Application October 27, 1937, Serial No. 171,371

1 Claim. (Cl. 220—89)

My invention relates to protective devices for electrical apparatus, and particularly to pressure relief devices for transformers.

In the electrical industry, and particularly the transformer art, the cases enclosing the windings or coils of the apparatus are usually provided with a frangible relief device which is responsive to predetermined pressures within the case. These frangible relief devices have not been altogether satisfactory in operation, since they sometimes rupture at pressures greatly below their normal rupturing point after only a short period of service. Under tests it has been proven that these failures occur because of excessive bending stress produced by dishing of the diaphragm from normal operating pressures within the apparatus.

An object of this invention is the provision of a protective device for electrical apparatus.

Another object of this invention is the provision of a pressure relief device for electrical apparatus responsive to continuous pressures of predetermined value or to sudden pressures of approximately the same predetermined value.

A further object of this invention is the provision of a pressure relief device responsive to predetermined sudden pressures that is so constructed as to prevent a substantial reduction of the rupturing strength when subjected to continuous pressures of long duration below the predetermined value.

Other objects of this invention will become apparent from the following description when taken in conjunction with the accompanying drawing, in which:

Figure 1 is a partial plan view of a pressure relief device embodying the teachings of this invention;

Fig. 2 is a cross-sectional view of the relief device taken along the line II—II of Fig. 1;

Fig. 3 is a cross-sectional view of the relief device illustrating the dishing effect, greatly exaggerated, of the device when subjected to pressures, and Fig. 4 is an elevational view partly in section illustrating the mounting of the protective device of Figs. 1, 2 and 3 in an electrical apparatus such as a transformer.

Referring to the drawing and particularly Fig. 4 thereof, this invention is illustrated with reference to a transformer 10 comprising an enclosing case 12 and having a core 14 and coils 16 immersed in a suitable dielectric medium 18 which is capable of evolving gases when decomposed. In order to protect the dielectric medium from contamination by the atmosphere, the case is sealed and in order to protect the electrical apparatus from pressures within the case caused by disturbances therein, a protective device 20 is carried by the cover of the sealed case. The protective device 20 is so constructed and designed as to normally maintain the case sealed from the atmosphere even during minor disturbances within the case, but to permit gas evolved from the dielectric medium within the case to escape to the atmosphere when the gas pressure within the case reaches a predetermined value.

In practice, the protective device 20 is usually a suitable housing having walls 22 disposed to seat in the conventional manhole 24 in the cover of the case. Any suitable means such as the stud bolts 26 may be employed to secure the protective device in assembled relation with the cover of the case. The structure and design of the protective device is known to the art having a cover 28 removably disposed on the walls 22. The cover 28 of the protective device carries bolts 30 so disposed that when the cover 28 is positioned on the walls 22 the bolts project through suitable openings in the flange 32 carried by the walls of the protective device. Since it is desired that the gases may escape from the protective device upon the occurrence of predetermined pressure therein, springs 34 are disposed about the bolts 30 between the flange 32 and securing nuts 36. The tension in the springs 34 may be so adjusted to any desired degree by tightening the nuts 36 that the cover will be lifted from the wall upon the occurrence of predetermined pressures in the protective device and permit the gases to escape.

Since it is desired to prevent the inert gas cushion normally maintained at varying pressures depending on the liquid level, within the case from escaping to the atmosphere, the lower end of the case carries a diaphragm 38 for covering and sealing the end of the protective device projecting within the case. The diaphragm 38 may be of any suitable material capable of rupturing under predetermined pressures. In practice, a diaphragm made from laminated layers of fibrous material impregnated with a condensation resin and consolidated under heat and pressure into a unitary structure has been found to be entirely satisfactory for this particular use. These diaphragms are easily reproduced so that diaphragms having the same physical characteristics may be produced in large quantities.

The diaphragm 38 may be secured in its operating position in the housing by means of a suitable retaining ring 40 held in position with respect to the housing and the diaphragm by any suitable means such as the bolts 42 disposed in spaced relation about the housing. With the diaphragm having the desired characteristics operatively held in position to cover the end of the protective housing, it is found that under continuous low pressures developed within the case 12 the diaphragm ruptures adjacent the wall 22 of the protective housing.

In order to prevent the rupturing of the diaphragm adjacent the walls of the protective device when subjected to the continuous low pressures, a reinforcing ring 44 of any suitable material may be disposed upon one side of the frangible diaphragm 38 as illustrated in Figs. 1, 2 and 3 of the drawing in such a manner that the reinforcing ring extends inwardly from the edge of the housing for a distance sufficient to reinforce the diaphragm and increase its rupturing strength along the side walls of the housing. The reinforcing ring 44 may be of the same material as the diaphragm 38 and is preferably sealed to the diaphragm to prevent slow leakage of internal gas to the atmosphere between the diaphragm and the reinforcing ring. Where desired, the ring and gasket being of the same material are readily molded under heat and pressure into an integral structure. By sealing the reinforcing ring to the diaphragm, any pressures applied to the diaphragm are immediately transferred to the reinforcing ring causing the diaphragm to be stressed in tension instead of bending as is found where a diaphragm of uniform thickness is employed.

In operation, the reinforced diaphragm is disposed as shown in Fig. 2 to cover the end of the protective device which projects within the case of the electrical apparatus. In positioning the diaphragm to cover the end of the protective housing, a gasket 46 is usually employed between the end of the wall 22 and the diaphragm for effecting a good joint therebetween. The reinforced diaphragm 38 may be maintained in its operative position with respect to the wall 22 of the protective device by means of the retaining ring 40 and the bolts 42 which are welded to the wall.

Upon the application of pressure to the diaphragm by gases evolved from the dielectric medium within the case, the diaphragm tends to bow or dish in an upwardly direction as viewed in Fig. 2. Because of the reinforcing ring 44 which is sealed to the one side of the diaphragm 38, the bowing or dishing action of the diaphragm 38 will be very slight and will not be effected at the point immediately adjacent the wall 22 of the protective device, but instead will be effectively distributed throughout the diaphragm. Thus if the dielectric medium within the case is continuously evolving small amounts of gases, the pressure built up within the case of the electrical apparatus will be gradually applied to the diaphragm causing a gradual dishing of the diaphragm until the rupturing strength of the frangible material is reached. At this point the diaphragm will rupture and the gases will flow into the housing of the protective device 20. If the gases thus admitted to the protective device 20 are under sufficient pressure, they will effect the lifting of the cover 28 of the protective device and then escape to the atmosphere until the pressure within the case is lowered to below a predetermined value.

If there is a sudden disturbance within the case containing the electrical apparatus, the sudden pressures caused by the evolution of gases from the dielectric medium will not cause a rupturing of the diaphragm 38 unless the pressure of the gases approximates the pressures under which the diaphragm will rupture when subjected to continuous pressures. This is because the reinforcing ring 44, as illustrated in the exaggerated view shown in Fig. 3, effectively resists the drawing in of the edges of the diaphragm preventing excessive dishing but permitting the rupturing of the diaphragm at the predetermined rupturing pressure. Because of the reinforcing ring, the diaphragm will assume approximately the same shape when bowed or dished under either sudden or continuous pressures and will consequently rupture when subjected to pressures applied suddenly or continuously when they approximate the predetermined rupturing strength of the diaphragm.

By providing the reinforcing ring on the diaphragm as described hereinbefore, excessive dishing of the diaphragm is prevented and the ratio of the strength of the diaphragm under continuous pressure to the strength of the diaphragm under sudden pressure is approximately the same. It is evident that the size of the reinforcing ring may be varied somewhat and that the most efficient size of the reinforcing ring for a given diaphragm having the characteristics of rupturing under certain predetermined pressures may be easily determined through experimentation.

In practice, a reinforcing ring of the laminated material described hereinbefore having a thickness of $\frac{3}{32}$ inch and an outside diameter of 14 inches and an inside diameter of 11 inches has been found suitable for use with a 14 inch diaphragm of the same material and having the same thickness as the reinforcing ring. Such a reinforcing ring increases the ratio of the rupturing strength of the diaphragm under continuous pressures to the rupturing strength under sudden pressures from a ratio of 3 to 12 up to a ratio of 10 to 14 or better.

Although this invention has been described with reference to a particular embodiment thereof, it is, of course, not to be limited thereto except insofar as is necessitated by the prior art and the scope of the appended claim.

I claim as my invention:

A protective device for electrical apparatus in a case which contains a dielectric medium capable of evolving gases when decomposed comprising, a housing carried by the case for providing a passageway for the flow of evolved gases from the case to the atmosphere, a diaphragm associated with the housing and disposed to cover said passageway to normally seal the case from the atmosphere, said diaphragm having the characteristics of being dished and ruptured when subjected to a predetermined sudden pressure or to a continuous pressure of predetermined value lower than the predetermined sudden pressure to permit the escape of the evolved gases through the housing, a reinforcing ring member sealed to the diaphragm on one side thereof adjacent the edge of the diaphragm, and means for securing the reinforced diaphragm to the housing to seal the case, the reinforcing ring extending inwardly from the housing along said side of the diaphragm for a distance sufficient to reinforce it and increase its rupturing strength by effectively resisting the drawing in of the edges of the diaphragm and preventing excessive and sudden dishing of the diaphragm adjacent the securing means and the housing and to cause the diaphragm to be stressed in tension when subjected to continuous pressures below the predetermined value, the rupturing strength of said reinforced diaphragm under continuous pressure approximating the rupturing strength of the diaphragm under sudden pressure.

LOUIS E. SAUER.